United States Patent [19]

Dawans et al.

[11] 4,359,325

[45] Nov. 16, 1982

[54] COPOLYMERS FROM ACRYLATE DICARBOXYLIC COMPOUNDS AND DIISOBUTYLENE AS OIL ADDITIVES

[75] Inventors: François Dawans, Bougival; Jean-Pierre Durand, Chatouo; Daniel Binet, Rueil-Malmaison, all of France

[73] Assignee: Institut Français du Petrole, Rueil-Malmaison, France

[21] Appl. No.: 216,453

[22] Filed: Dec. 15, 1980

[30] Foreign Application Priority Data

Dec. 13, 1979 [FR] France .................................. 79 30557
Dec. 13, 1979 [FR] France .................................. 79 30558

[51] Int. Cl.³ ........................ C10L 1/22; C08F 220/12; C08K 5/01; C08L 1/18

[52] U.S. Cl. .......................................... 44/62; 44/70; 252/51.5 R; 252/51.5 A; 252/56 R; 252/56 D; 524/549; 524/555; 524/556; 525/327.6; 525/327.7; 525/329.6; 526/264; 526/272; 526/304; 526/306; 526/317; 526/318; 526/324

[58] Field of Search ............... 526/272, 264, 324, 318, 526/317, 306, 304; 525/327; 260/33.6 UA; 44/62, 70; 252/51.5 R, 51.5 A, 56 R, 56 D; 524/549, 555, 556

[56] References Cited

U.S. PATENT DOCUMENTS

2,892,790  6/1959  Stuart et al. ........................ 526/324
2,892,818  6/1959  Lowe et al. ......................... 526/324
2,892,819  6/1959  Stewart et al. ..................... 526/324

*Primary Examiner*—Stanford M. Levin
*Attorney, Agent, or Firm*—Millen & White

[57] ABSTRACT

Copolymers comprising acrylic ester units, dicarboxylic compounds units and diisobutylene units and whose average molecular weight by number is from 500 to 250,000 are useful for improving the cold-flow properties of lube oils and other hydrocarbon oils such as diesel oil, heavy fuel oil, residual fuel oil and crude petroleum.

30 Claims, No Drawings

COPOLYMERS FROM ACRYLATE DICARBOXYLIC COMPOUNDS AND DIISOBUTYLENE AS OIL ADDITIVES

BACKGROUND OF THE INVENTION

This invention relates to new terpolymers which can be used, for example, as additives improving the cold-flow properties of lubricating oils and various hydrocarbon oils.

It also relates to lubricating oil compositions comprising these terpolymers.

It also relates to hydrocarbon oils such as diesel oils, domestic fuel oils, heavy fuel oils (fuel oils No. 2), residual fuel oils or crude oils whose congealing point or freezing point is decreased by adding terpolymers soluble in these hydrocarbon oils.

The lubricating oil compositions adapted to internal combustion engines and to automatic power transmissions require, in the base oil, associated additives exhibiting a number of properties, in addition to their lubricating power. These properties comprise decreasing the freezing point or the congealing point of the oil, heat stability and resistance to oxidation, rust and corrosion inhibition, dispersion of the carbon deposits and of the insoluble materials formed by fuel combustion and oil oxidation, neutralization of the acid materials formed by oil oxidation and finally improvement of the viscosity index.

Various compositions have been described in the literature, which comprise copolymers obtained by the addition reaction of alpha-olefins with dicarboxylic alkenes, which are thereafter esterified with long chain saturated straight-chain alcohols, so as to make the copolymers soluble in hydrocarbon oils in appropriate manner; polyamino compounds are then added, so as to form dispersion agents or agents improving the viscosity index of lubricants.

Polymeric acrylic esters are also known to decrease the freezing point or the congealing point of lubricating oils, and a known factor having a particularly great influence in that case is the length of the lateral alkyl chains; the presence of a sufficient number of long lateral alkyl chains is apparently decisive to obtain sufficient solubility of the additive in hydrocarbon oils.

Finally, it is also known that, although copolymers of acrylic esters with certain alpha-olefins, such as ethylene or propylene, can be obtained easily, it is impossible to obtain copolymers of acrylic esters having a high diisobutylene content, taking the too low reactivity of this monomer into account.

It has now been found that copolymers of acrylic esters containing an important proportion of diisobutylene can be obtained easily (particularly in moderate conditions of temperature and pressure) by adding an ethylenically unsaturated dicarboxylic compound, in at least equimolar proportion with respect to diisobutylene, to the monomer mixture.

It has also been found that the resultant terpolymers greatly improve the cold-flow properties of lubricating oils, the presence of diisobutylene units in these additives improving their solubility in hydrocarbon oils.

Another advantage of the terpolymer additives of the invention, as compared with the anti-freeze additives of the prior art, containing acrylic esters, lies in the possibility to also improve the dispersion effect, the presence of carboxylic anhydride or carboxylic acid units in the terpolymers of the invention allowing a further reaction with (poly-)amino and/or (poly-)hydroxy compounds.

Finally the use of these terpolymers as additives having both improved properties for decreasing the freezing point or the congealing point and dispersion properties for lubricants is advantageous from the economic point of view, since, on the one hand, incorporating important amounts of diisobutylene and maleic anhydride into acrylic esters contributes to decreasing the final price of the additive, without disadvantage as concerns the properties, and, on the other hand, the dispersant properties of the anti-freeze additive provide for a reduction or suppression of an additional use of conventional dispersant additives for lubricating oils.

It is well known that certain hydrocarbon oils contain such compounds as paraffins, asphaltenes or resins which make them viscous and impart unacceptable flow properties. These oils behave at low temperature as non-newtonian fluids; they have a congealing or freezing point, as well as particular hysteresis properties which greatly limit their use, for example, as fuel oils, and their production, particularly, as far as crude oil are concerned.

A prior technique which obviates these disadvantages consists of subjecting the hydrocarbon oils to dewaxing or deasphalting processes; however these processes are often very expensive.

Another technique which is used to decrease the viscosity or the freezing point of the hydrocarbon oils having a high content of asphaltic and/or paraffinic compounds consists of diluting them by adding lighter hydrocarbon oils or distillates. This is also an expensive technique since light oils have a far higher cost than heavy oils.

A third technique, which is very often the least expensive and has the highest efficiency, consists of adding small amounts of polymeric additives to fluidify the hydrocarbon oil or improve its cold-flow properties.

Among the numerous additives proposed in the prior art, mention may be made of polymers or copolymers based on α-olefins or diolefins, optionally hydrogenated and/or alkylated, the polymers or copolymers of unsaturated esters, such as acrylates or methacrylates, as well as certain copolymers of α-olefins with unsaturated esters, such as copolymers of ethylene or propylene with vinyl acetate or with acrylates and methacrylates. These additives are known to decrease the limit filterability temperature of diesel oils or domestic fuel oils, and to improve the cold-flow properties of certain highly paraffinic fuel oils or crude oils. However these additives are not very efficient to improve the fluidity and the flow properties of heavy hydrocarbon oils, such as high-boiling fuel oils, fuel oils No. 2, residues of atmospheric distillation (residual fuel oils) or highly asphaltenic crude oils.

It has now been found that the cold-flow properties of these hydrocarbon oil compositions (particularly fluidity, in the case of heavy oils) can be improved by adding small amounts of certain terpolymers, as hereinafter defined.

OBJECTS OF THE INVENTION

The present invention has for object to supply additives improving the cold-flow properties of lubricating oils, particularly by decreasing their freezing point or congealing point. It has also for object to supply a multi-functional additive for lubricating oils which has a desirable range of properties, in addition to the individual property of decreasing the pour point, such as improving the detergent and dispersant properties and the viscosity index.

It has also for object to supply additives improving the cold-flow properties of hydrocarbon oils such as diesel oils, domestic fuel oils, heavy fuel oils, fuel oil No. 2, residual fuel oils and crude oils.

DETAILED DISCUSSION

The terpolymers of the invention may be defined generally as comprising units of at least one acrylic ester, at least one ethylenically unsaturated $\alpha,\beta$-dicarboxylic compound and diisobutylene, these terpolymers being optionally reacted thereafter with at least one (poly-)amino and/or (poly-)hydroxy compound.

The terpolymers of the invention are mainly characterized in that they comprise at least three different types of units:

(A) acrylic ester units of the general formula

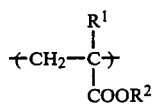

in which $R^1$ is a hydrogen atom or a methyl radical and $R^2$ is an alkyl radical of 1–30 carbon atoms or a mixture of these radicals;

(B) $\alpha,\beta$-dicarboxylic units complying with one of the general formulas:

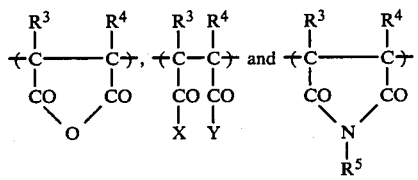

in which $R^3$ and $R^4$, which are identical or different, represent a hydrogen atom or a methyl radical, X and Y, which are identical or different, are selected from the $-OH$, $-OR^2$, $-OR^5$, $-NH_2$ and $-NHR^5$ groups, where $R^2$ is above defined and $R^5$ is a monovalent organic radical derived from a compound having at least one hydroxy group and/or at least one amino group;

and (C) units of the formula

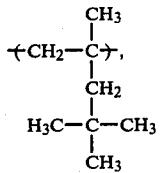

as obtained from diisobutylene.

The respective proportions of the (A), (B) and (C) units in the terpolymers of the invention are usually from 10 to 94% by mole for the (A) units, from 3 to 65% by mole for the (B) units and from 3 to 40% by mole for the (C) units. It is also advantageous that the content of (B) units, as obtained from an ethylenically unsaturated dicarboxylic compound, be at least the same as the content of the (C) units, as obtained from diisobutylene. Their average molecular weight by number is usually from 500 to 250,000.

The terpolymers of the invention may be manufactured according to conventional polymerization methods, via the radical method, for example in the presence of an initiator of the azobisisobutyronitrile or peroxide type, in bulk or in solution in a hydrocarbon solvent, for example, cyclohexane, isooctane, dodecane, benzene, toluene, xylene, diisopropylbenzene, tetrahydrofuran or dioxan. High boiling hydrocarbon cuts are preferred, such as kerosine or diesel oil.

If desired, the polymerization may be effected in a lubricating oil.

It is usually operated under atmospheric pressure and at a temperature not in excess of 140° C., e.g. between 60° and 120° C.

Appropriate proportions of the monomers are used, usually at least one molar proportion of ethylenically unsaturated $\alpha,\beta$-dicarboxylic compound (for example, maleic anhydride) per molar proportion of diisobutylene.

If it is desired to obtain terpolymers according to the invention having ester, amide or imide groups in at least one portion of the (B) units, it is possible to thereafter react the reaction mixture with a (poly-)amino and/or (poly-)hydroxy compound at a temperature usually between 80° and 160° C. (optionally in the presence of a small amount of an acid soluble in a hydrocarbon phase, when the compound is essentially of the (poly-)hydroxy type.

The terpolymers of the invention, which can be used more particularly as additives improving the cold-flow properties of lubricating oils, have the following useful properties.

The acrylic esters which supply the (A) units consist more particularly of compounds of the general formula

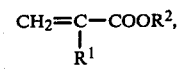

wherein $R^1$ is preferably a methyl radical and $R^2$ is an alkyl radical of 1–30 carbon atoms, preferably 4–18 carbon atoms.

Examples of such compounds are mainly methyl, propyl, butyl, 2-ethyl hexyl, decyl, dodecyl, hexadecyl, octadecyl and eicosyl methacrylates. Butyl methacrylate is used with advantage, as well as methacrylates of industrial alcohol cuts having 12 carbon atoms (lauryl methacrylate) or 18 carbon atoms (stearyl methacrylate) as an average.

The ethylenically unsaturated $\alpha,\beta$-dicarboxylic compounds supplying the (B) units consist more particularly of the maleic or citraconic anhydrides or acids, or fumaric or mesaconic acids or the corresponding derivatives having at least one ester or amide group, or the corresponding, optionally N-substituted imides; greater use is made of maleic compounds.

The respective proportions of the (A), (B) and (C) units in the terpolymers may vary widely.

Thus, for example, these terpolymers may comprise from 20 to 90%, preferably from 40 to 75% by mole of units of the formula (A), from 5 to 65%, preferably from 10 to 40% by mole of units of the formula (B) and from 5 to 40%, preferably from 10 to 30% by mole of units of the formula (C).

Their average molecular weight by number, determined by tonometry or osmometry, is usually selected between 500 and 250,000, preferably from 3,000 to 70,000.

When a (poly-)amino and/or a (poly-)hydroxy compound is used to prepare terpolymers according to the invention, useful as additives for lubricating oils, in order to obtain heat-stable products having satisfactory qualities of dispersivity, while retaining sufficient solubility of the terpolymers in a lubricating oil, this compound is preferably selected from 3-dimethylaminopropylamine, triethylene tetramine, tetraethylene pentamine, 2-amino pyridine, diethylethanolamine, diethanolamine, 1-cyano guanidine, trimethylolpropane, glycerol or pentaerythritol.

According to a particularly preferred embodiment of the process for manufacturing the additive of the invention, a concentrated solution is directly prepared, containing about 10 to 40% by weight of terpolymer in a solvent consisting of an appropriate oil, for example, a neutral mineral oil or a lubricating oil having a viscosity between about 75 and about 350 universal Saybolt seconds at 37.8° C.

The soluble terpolymers of the invention may be incorporated in lubricating oils (for example in lubricating oils for automotive engines or for transmissions) at various concentrations, usually between about 0.01 and 4% by weight, preferably between 0.5 and 2% b.w. of the total lubricating oil.

The lubricants in which the terpolymers of the present invention may be incorporated comprise not only hydrocarbon oils or hydrorefined oils of petroleum, asphaltic sand, shale or coal origin, but also synthetic oils, such as alkylene polymers or alkylene oxide polymers, alkylbenzenes, dialkylbenzenes and polyphenyls. The oils consist preferably of naphthenic or paraffinic bases, or their mixtures.

The additive is advantageously supplied in a prediluted form comprising, for example, from 10 to 60 parts by weight, preferably about 40 parts by weight, of the additive, dissolved in 90 to 40 parts by weight, preferably about 60 parts by weight, of a mineral lubricating oil, with or without other additives.

It is also clear that, without departing from the scope of the invention, it is also possible to add other conventionally used additives to the lubricating oil compositions of the invention, such as, for example, corrosion inhibitors, anti-emulsifying agents, antioxidants, detergents or dispersants, or again additives improving the viscosity index. Probably due to a combination of appropriate ester and olefinic units, the terpolymers of the invention have better compatibility and better antifreezing efficiency in the presence of viscosity additives of the polyolefinic type, which additives find greater and greater use in the lubricants.

The terpolymers of the invention which can particularly be used as additives for improving the cold-flow properties of hydrocarbon oils such as diesel oil, domestic fuel oil, heavy fuel oil, fuel oil No. 2, residual fuel oil and crude oil have usefully the following properties.

The acrylic esters which supply the units (A) consist particularly of compounds of the general formula

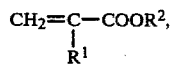

wherein $R^1$ is preferably a hydrogen atom and $R^2$ represents an alkyl radical of 1–30 carbon atoms, preferably 4–22 carbon atoms.

By way of illustration of acrylic esters supplying the units (A) of the terpolymers, mention is made of methyl, propyl, butyl, ethylhexyl, decyl, hexadecyl, dodecyl, octadecyl, eicosyl or docosyl acrylates. Other examples are the acrylates of industrial alcohol cuts containing 12 carbon atoms (lauryl acrylate), 18 carbon atoms (stearyl acrylate) or 20 to 22 carbon atoms as an average.

Examples of $\alpha,\beta$-unsaturated dicarboxylic compounds supplying units (B) of the terpolymers of the invention are maleic or citraconic, or fumaric or mesaconic acids the corresponding derivatives having at least one ester or amide group and the corresponding imides (optionally N-substituted).

Both for reasons of availability and price of the starting materials and for reasons of solubility and performance of the terpolymers in the hydrocarbon oils, the monomers supplying the units (A) are preferably selected from methyl, butyl, ethylhexyl, stearyl, lauryl, eicosyl or docosyl acrylates, and those supplying the units (B) from maleic anhydride, maleic or fumaric acid, alkyl maleates and maleimides, optionally with N-substitution.

The respective contents of the units (A), (B) and (C) in the terpolymers used in the invention may vary widely. Thus, for example, for 100 units of these terpolymers, the number of units (A) may be 10 to 94, preferably 40 to 80, the number of units (B) may be 3 to 50, preferably 10 to 35, and the number of units (C) may be 3 to 40, preferably 10 to 25. It is also possible to operate somewhat outside of these values, without departing from the scope of the invention.

The average molecular weight by number of the terpolymers is from 500 to 200,000, preferably 1,000 to 70,000.

When a (poly-)amino and/or (poly-)hydroxy compound is used for manufacturing terpolymers of the invention, useful as additives for hydrocarbon oils such as diesel oil, domestic fuel oil, heavy fuel oil, fuel oil No. 2, residual fuel oil and crude oil, the amidation and/or imidation and/or esterification reactions for all or part of the carboxylic groups of the terpolymer, during the second step, confer to the hydrocarbon oil compositions additional properties of dispersivity and anti-flocculating agent or agent impeding asphaltene sedimentation, which properties are often very useful for improving the fluidity of the heavy hydrocarbon oils. In addition, the esterification of a portion of the carboxylic groups of the terpolymer with long chain linear saturated alcohols, having for example up to 30 carbon atoms, may contribute to increase the solubility of the additive in oil and its activity as pour point depressant.

According to another embodiment for synthesizing terpolymers according to the invention, one or more unsaturated monoesters are terpolymerized via the radical method with a mixture of alkyl maleates and/or maleimides, optionally N-substituted, and diisobutylene.

For manufacturing the improved hydrocarbon oil compositions of the invention, there is commonly used from 0.005 to 2% by weight, preferably from 0.01 to 0.5% b.w., of one or more terpolymers, with respect to the weight of the hydrocarbon oil.

The terpolymer in powdered or granulated form may be directly admixed with the oil to be treated; however it is preferably added as a concentrated solution, for example a solution containing 20 to 60 parts b.w. of terpolymer dissolved in 80 to 40 parts b.w. of toluene, xylene, kerosine or diesel oil. The mixture may be made at room temperature; however it is often better to mix when hot, for example by adding the terpolymer solution at a temperature from 30° to 150° C.

It is clear that, without departing from the scope of the invention, the compositions of hydrocarbon oils may also contain other commonly used additives, such as corrosion inhibitors, anti-emulsifying agents, antistatic agents, antioxidants, etc.

The following non-limitative examples illustrate various embodiments of the invention.

EXAMPLE 1

A solution of 22.5 g ($66.5 \times 10^{-3}$ mole) of stearyl methacrylate, 10 g ($89.2 \times 10^{-3}$ mole) of diisobutylene and 7.5 g ($76.5 \times 10^{-3}$ mole) of maleic anhydride in 80 cc of toluene is heated up to 90° C. A solution containing 0.3 g of azobisisobutyronitrile in 20 cc of toluene is slowly added (addition rate: 10 cc/h) and the mixture is stirred at 90° C. for 4 hours.

A portion of the reaction mixture is caused to precipitate in an excess of methyl alcohol; the precipitate is isolated by filtration and dried under reduced pressure up to constant weight. The resultant terpolymer contains about 54% by mole of stearyl methacrylate, 20% by mole of diisobutylene and 26% by mole of maleic anhydride; it has an average molecular weight by number of 10,200.

A pre-diluted form of the terpolymer is obtained by admixing the toluenic solution with a lubricating oil, for example a 200 N or 350 N oil, and toluene is evaporated thereafter up to constant weight.

EXAMPLE 2

13 g of the terpolymer of example 1 are dissolved into 50 cc of a 200 N lubricating oil and 2 g of dimethylamino-propylamine are added; the mixture is stirred for 4 hours at 150° C.

The infra-red spectrum of the resultant solution shows the disappearance of the absorption band corresponding to the C=O bonds of the anhydride type, located initially at about 1775 cm$^{-1}$ conversely, a new absorption band appears at about 1705–1695 cm$^{-1}$, attributable to the C=O bonds of the imide type.

EXAMPLE 3

A solution of 14 g ($41.4 \times 10^{-3}$ mole) of stearyl methacrylate, 6 g ($32.6 \times 10^{-3}$ mole) of 2-ethylhexyl acrylate, 7 g ($62.5 \times 10^{-3}$ mole) of diisobutylene and 10 g ($10.2 \times 10^{-2}$ mole) of maleic anhydride in 100 cc of a 100 N lubricating oil is heated at 80° C. for 2 hours in the presence of 0.4 g of azobisisobutyronitrile and then at 100° C. for 2 hours. 1.5 g of tetraethylene-pentamine is then added and the mixture is stirred at 140° C. for 2 hours.

EXAMPLE 4

A mixture of 13 g ($51.2 \times 10^{-3}$ mole) of lauryl methacrylate, 11 g ($32.5 \times 10^{-3}$ mole) of stearyl methacrylate, 6 g ($53.5 \times 10^{-3}$ mole) of diisobutylene and 8 g ($81.6 \times 10^{-3}$ mole) of maleic anhydride is dissolved into 140 cc of toluene. 0.8 g of dicumyl peroxide is added and the mixture is heated at 120° C. for 2 hours. After addition of 8 g of diethanolamine, heating is continued at 100° C. for 4 hours. A concentrate of additive in a lubricating oil is prepared by adding 50 cc of a 350 N oil and evaporating toluene under reduced pressure up to constant weight.

EXAMPLE 5

A mixture of 40 g ($12.3 \times 10^{-2}$ mole) of stearyl acrylate, 10 g ($70.4 \times 10^{-3}$ mole) of butyl methacrylate, 5 g (0.05 mole) of methyl methacrylate, 25 g ($22.3 \times 10^{-2}$ mole) of diisobutylene and 30 g ($30.6 \times 10^{-2}$ mole) of maleic anhydride is heated at 90° C. for 3 hours, in the presence of 1.1 g of benzoyl peroxide, then at 110° C. for 2 hours. The mixture is then evaporated under reduced pressure at 110° C. or 1 hour, so as to remove any residual monomer. The residue is then dissolved under stirring at 100° C. into 350 cc of a 200 N lubricating oil. 28 g of dimethylaminopropylamine is added and the solution is stirred at 150° C. for 4 hours.

EXAMPLE 6

A solution of 51 g ($15.1 \times 10^{-2}$ mole) of stearyl methacrylate, 37 g ($14.5 \times 10^{-2}$ mole) of lauryl methacrylate and 1.6 g of azobisisobutyronitrile in 200 cc of dioxane is added in 4 hours to a solution of 33 g ($29.4 \times 10^{-2}$ mole) of diisobutylene and 40 g ($40.8 \times 10^{-2}$ mole) of maleic anhydride in 200 cc of dioxane at 70° C. Heating at 70° C. is continued for 4 more hours.

Half of the solution is caused to settle in an excess of methyl alcohol and the precipitate is isolated by filtration, washed with alcohol and dried under reduced pressure up to constant weight. There is thus obtained 74 g of terpolymer having an average molecular weight by number of 4700, the maleic anhydride and diisobutylene contents being respectively 46 and 24% by mole.

EXAMPLE 7

200 cc of a 100 N lubricating oil are added to the remainder of the reaction solution of example 6, and dioxane is distilled under reduced pressure up to constant weight. 40 g of trimethylolpropane and 0.6 g of paratoluenesulfonic acid are added and the mixture is heated at 150° C. for 4 hours.

The infra-red spectrum of the solution shows the disappearance of the absorption at frequencies corresponding to the C=O bonds of the anhydride groups, the absorption frequence of the newly formed C=O bonds of the ester type mingling with that of the ester C=O bonds of the methacrylates, located at about 1725–1735 cm$^{-1}$.

EXAMPLE 8

The solutions of the various terpolymers described above have been added to a number of lubricating oils and the decrease of the pour point has been determined according to the AFNOR NFT 60-105 or ASTM D 97 standard.

As results from the following Table 1, the terpolymers of the invention are very efficient for decreasing the pour point of lubricants.

TABLE 1

| PRODUCT OF EXAMPLE | % b.w. of TERPOLYMER | LUBE OIL | POUR POINT °C. |
|---|---|---|---|
| — | 0 | 200 N | −15 |
| — | 0 | 350 N | −9 |
| 1 | 0.5 | 200 N | −30 |
| 1 | 0.5 | 350 N | −27 |
| 2 | 0.5 | 200 N | −30 |
| 3 | 0.5 | 350 N | −24 |
| 4 | 0.5 | 350 N | −30 |
| 4 | 0.3 | 350 N | −27 |
| 5 | 0.5 | 200 N | −35 |
| 6 | 0.5 | 200 N | −26 |

TABLE 1-continued

| PRODUCT OF EXAMPLE | % b.w. of TERPOLYMER | LUBE OIL | POUR POINT °C. |
|---|---|---|---|
| 6 | 0.5 | 350 N | −24 |
| 7 | 0.5 | 200 N | −26 |

The dispersant effect of some of the above anti-freezing additives has been determined according to the spot method described by V. A. Gates and coll. in the SAE preprint No. 572 (1955) or by A. Schilling in "Oils for engines and engine lubrication", edit. Technip, tome I, p. 89 (1962). According to this method, there is determined after 24 h the ratio of the diameters of two concentrical spots formed by depositing an oil drop containing 2% b.w. of additive and 1% b.w. of sludge onto a sheet of filter paper. The results are determined at 20° C. (A), at 200° C. (B) and after cooling to 20° C. (C).

As shown by the results summarized in the following Table 2, the terpolymers which decrease the pour point of lubricants according to the invention may also be efficient dispersion agents, useful also at the low usual concentrations of the pour point depressant additives.

TABLE 2

| PRODUCT OF EXAMPLE | DISPERSING EFFECT | | |
|---|---|---|---|
|  | (A) | (B) | (C) |
| 2 | 0.80 | 0.75 | 0.78 |
| 2* | 0.68 | 0.69 | 0.70 |
| 3 | 0.82 | 0.77 | 0.79 |
| 4 | 0.75 | 0.71 | 0.71 |
| 5 | 0.83 | 0.81 | 0.81 |
| 5* | 0.72 | 0.71 | 0.71 |
| 7 | 0.74 | 0.76 | 0.78 |

*In these two cases, 0.5% b.w. of terpolymer was used.

EXAMPLE 9

A mixture of 11 g ($110 \times 10^{-3}$ mole) of methyl methacrylate, 62 g ($244 \times 10^{-3}$ mole) of lauryl methacrylate, 27 g ($79.8 \times 10^{-3}$ mole) of stearyl methacrylate, 6 g ($61.2 \times 10^{-3}$ mole) of maleic anhydride and 6.7 g ($59.8 \times 10^{-3}$ mole) of diisobutylene is dissolved into 82 cc of a 100 N lubricating oil and heated at 100° C. under stirring. 0.386 g of azobisisobutyronitrile is progressively added, in 4 hours, and thereafter heating is continued for 1 hour. 6 g ($58.8 \times 10^{-3}$ mole) of dimethylaminopropylamine is added and the mixture is stirred at 140° C. for 4 hours. A brown-reddish viscous solution is thus obtained.

6.8 cc of this solution are added to 93.2 cc of a 200 N lubricating oil. The resultant mixture has a pour point of −29° C., a viscosity of 14.82 centistokes at 100° C. and a piston rating of 84.3 (100=perfectly clean piston) when tested in a diesel engine for 50 hours.

EXAMPLE 10

0.5 g of azobisisobutyronitrile is added to a solution of 32 g ($9.87 \times 10^{-2}$ mole) of stearyl acrylate, 11 g ($11.22 \times 10^{-2}$ mole) of maleic anhydride and 10 g ($8.92 \times 10^{-2}$ mole) of diisobutylene in 250 cc of toluene and the mixture is stirred at 90° C. for 6 hours.

100 cc of the solution is caused to settle in an excess of methyl alcohol; the precipitate is isolated by filtration, washed with alcohol and dried under reduced pressure up to constant weight.

17 g of a terpolymer having an average molecular weight by number of 4100 and containing about 48% by mole of stearyl acrylate, 32% by mole of maleic anhydride and 20% by mole of diisobutylene is thus obtained.

300 ppm of this terpolymer is added to a Mandji atmospheric residue whose properties are summarized hereunder:

| Specific weight at 15° C. (kg/l) | 0.9581 |
|---|---|
| S (% by weight) | 1.86 |
| Asphaltenes (% by weight) | 2.80 |
| Pour point (°C.) | +33 |
| Kinematic viscosity at 50° C. | 1060 cst | the pour point is thus decreased to +15° C.

On the other hand, the rheologic behavior of an Egyptian crude oil was examined with a rotation viscosimeter; it was found that adding 300 ppm of this terpolymer decreased the yield value and the plastic viscosity.

EXAMPLE 11

3.8 g ($3.7 \times 10^{-2}$ mole) of dimethylaminopropylamine are added to 100 cc of the solution of example 10 and the mixture is stirred at 150° C. for 4 hours. The terpolymer is then isolated by settling in methyl alcohol, as in example 10.

The infrared spectrum of the modified polymer, as obtained in these conditions, shows the disappearance of the absorption band attributable to the C=O bonds of the anhydride type, initially located at about 1775 cm$^{-1}$; conversely, a new absorption band appears at about 1705-1695 cm$^{-1}$, attributable to the formation of C=O bonds of the imide type.

The method to determine the dispersing activity or the anti-flocculating activity of the imide-terpolymer is based on its dispersion power for asphaltenes contained in a hydrocarbon oil. The asphaltenes are obtained by air-oxidizing a naphthenic oil in the presence of traces of an iron salt as catalyst. The oxidation is preferably effected at 175° C. for about 72 hours by passing an air stream through the naphthenic oil, so as to form settlings which can be separated by centrifugation. 2% by weight of this settling are added to a hydrocarbon oil solution containing 0.5% b.w. of terpolymer; after stirring of the mixture between 90° and 150° C. for 2 hours, the resultant colored solution remains clear when standstill, which confirms the dispersant activity of the terpolymer with respect to the asphaltenes.

300 ppm of the imide-terpolymer is added to an Indian crude oil heated to 60° C.; the pour point is decreased from +33° C. to +18° C.

EXAMPLE 12

A solution of 1.2 g of dicumyl peroxide in 20 cc of diisopropylbenzene is added in 2 hours to a solution of 66 g ($20.37 \times 10^{-2}$ mole) of stearyl acrylate, 18 g ($9.78 \times 10^{-2}$ mole) of 2-ethylhexyl acrylate, 12 g ($10.71 \times 10^{-2}$ mole) of diisobutylene and 31 g ($13.59 \times 10^{-2}$ mole) of dibutyl maleate in 500 cc of diisopropylbenzene heated to 120° C.; heating is continued at 120° C. for 4 hours.

The average molecular weight of the product obtained by settling of the mixture in methyl alcohol is about 7,000.

A sample of the crude solution in diisopropylbenzene is added to a residual fuel oil (a vacuum residue of a desulfurized Arabian oil) having a pour point of about −4° C.; in the presence of 300 ppm of terpolymer, the pour point is decreased to about −15° C.

EXAMPLE 13

A mixture of 24 g ($21.43 \times 10^{-2}$ mole) of diisobutylene and 40 g ($21.97 \times 10^{-2}$ mole) of the maleimide obtained by reacting maleic anhydride with dimethylaminopropylamine in 500 cc of a diesel oil having a distillation range from 150° to 370° C. is heated to 90° C.; 500 cc of a diesel oil solution containing 32 g ($9.87 \times 10^{-2}$ mole) of stearyl acrylate, 50 g ($20.83 \times 10^{-2}$ mole) of lauryl acrylate and 1.2 g of azobisisobutyronitrile are added progressively thereto. When the addition has been completed, stirring of the reaction mixture is continued at 90° C. for 4 hours.

A sample of the resultant solution is added to the Mandji atmospheric residuum, as used in example 10, having a pour point of +33° C.; with 200 ppm of terpolymer the pour point is decreased to about +12° C.

A satisfactory dispersion power is observed in the asphaltene test of example 11.

EXAMPLE 14

1 g of benzoyl peroxide is added to a solution of 15 g ($10.56 \times 10^{-2}$ mole) of butyl methacrylate, 18 g ($9.78 \times 10^{-2}$ mole) of 2-ethylhexyl acrylate, 20 g ($17.86 \times 10^{-2}$ mole) of diisobutylene and 40 g ($40.82 \times 10^{-2}$ mole) of maleic anhydride in kerosine. The mixture is progressively heated at 70° C. for 2 hours and then at 90° C. for 2 hours and finally at 110° C. for 2 hours. 216 g (0.8 mole) of "Alfol 18" (a cut of saturated linear mono-alcohols having 18 carbon atoms as an average) and 2.8 g of paratoluenesulfonic acid are then added and the mixture is stirred at 150° C. for 4 hours, which results to a practically complete esterification of the anhydride groups with Alfol.

160 ppm of the esterified polymer can be used to decrease the pour point of an Aramco vacuum residue from +24° C. to +15° C.

EXAMPLE 15

A solution of 28 g $C_{20-22}$ acrylate, 6 g maleic anhydride and 6 g diisobutylene in 40 cc toluene is stirred at 85° C. 0.8 g azobisisobutyronitrile is added and heating is continued for 4 hours. A concentrated solution of terpolymer is thus obtained, which remains fluid when cooled to 22° C. A sample of this solution is added at 50° C. to an Indian crude oil having a pour point of +27° C.; with 300 ppm of terpolymer, the pour point decreases to 0° C.

EXAMPLE 16

A mixture of 32 g $C_{20-22}$ acrylates, 4 g maleic anhydride and 4 g diisobutylene in 40 cc xylene is stirred at 85° C. for 4 hours in the presence of 0.8 g azobisobutyronitrile. 4 g of dimethylaminopropylamine is added and heating is continued at 140° C. for 2 hours.

A sample of this solution is added at 50° C. to an Indian crude oil, so as to have a 500 ppm terpolymer concentration. The pour point of the additive-containing crude oil is +3° C., while it is +30° C. without additive; the plastic viscosity determined with a rotation viscosimeter ROTOVISCO HAAKE RV 12 is decreased from 22 to 8 centipoises and the yield value is decreased from 50 dyne/cm² to 10 dyne/cm².

What is claimed is:

1. A copolymer consisting essentially of:

(A) 10–94% by mole of acrylic ester units having the formula

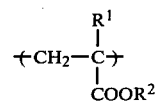

wherein $R^1$ is H or $CH_3$; and $R^2$ is $C_{1-30}$ alkyl;

(B) 3–65% by mole of dicarboxylic units having the formula

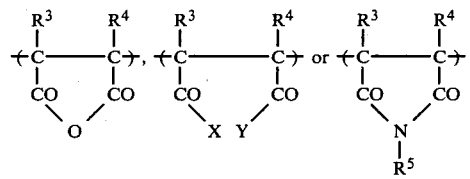

wherein $R^3$ and $R^4$ are each independently H or $CH_3$; X and Y are each independently $OR^2$, $OR^5$ or $NHR^5$; wherein $R^2$ is $C_{1-30}$ alkyl; and $R^5$ is H or a monovalent organic radical; and (C) 3–40% by mole of diisobutylene units having the formula

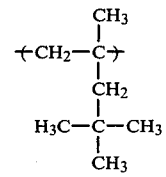

wherein the molar proportion of the units having the formula (B) is at least as high as the molar proportion of the units having the formula (C); and wherein said copolymer has a number average molecular weight of 500–250,000.

2. A copolymer according to claim 1, wherein in at least a portion of the units having the formula (A), $R^1$ is $CH_3$ and $R^2$ is $C_{4-18}$ alkyl.

3. A copolymer according to claim 1, wherein in at least a portion of the units having the formula (A), $R^1$ is H and $R^2$ is $C_{4-22}$ alkyl.

4. A copolymer according to claim 1, wherein in at least a portion of the units having the formula (B), $R^3$ and $R^4$ are each H.

5. A copolymer according to claim 1, wherein at least a portion of the dicarboxylic units (B) have the formula

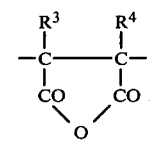

wherein $R^3$ and $R^4$ are each independently H or $CH_3$.

6. A copolymer according to claim 1, wherein at least a portion of the dicarboxylic units (B) have the formula

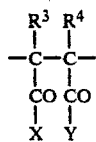

wherein $R^3$ and $R^4$ are each independently H or $CH_3$; and wherein at least one of X and Y is $OR^2$ or $OR^5$, $R^2$ being butyl or $C_{18}$ alkyl, and $R^5$ being the monovalent organic radical corresponding to the alcohol $R^5OH$, wherein $R^5OH$ is pentaerythritol, glycerol, trimethylolpropane, diethylethanolamine or diethanolamine.

7. A copolymer according to claim 1, wherein at least a portion of the dicarboxylic units (B) have the formula

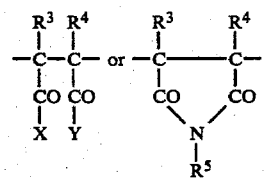

wherein $R^3$ and $R^4$ are each independently H or $CH_3$; and wherein at least one of X and Y is $NHR^5$, $R^5$ in all occurrences being the monovalent organic radical corresponding to the amine $R^5NH_2$, wherein $R^5NH_2$ is dimethylaminopropylamine, triethylenetetramine, tetraethylenepentamine, 2-aminopyridine or 1-cyanoguanidine.

8. A hydrocarbon oil composition comprising a major proportion of hydrocarbon oil and a minor proportion of at least one copolymer according to claim 1 sufficient to improve the cold-flow properties of said hydrocarbon oil.

9. A composition according to claim 8, wherein said hydrocarbon oil is a lubricating oil and said copolymer has 20 to 90% by mole of units having the formula (A), 5 to 65% by mole of units having the formula (B) and 5 to 40% by mole of units having the formula (C).

10. A composition according to claim 9, wherein in said copolymer, the units having the formula (A) amount to 40-75% by mole, the units having the formula (B) amount to 10-40% by mole and the units having the formula (C) amount to 10-30% by mole.

11. A composition according to claim 9, wherein the number average molecular weight of said copolymer is from 3,000 to 70,000.

12. A composition according to claim 9, wherein the proportion of said copolymer is from 0.01 to 4% by weight.

13. A composition according to claim 12, wherein the proportion of said copolymer is from 0.5 to 2% by weight.

14. A composition according to claim 9, wherein in said copolymer, in at least a portion of the units having the formula (A), $R^1$ is $CH_3$ and $R^2$ is $C_{4-18}$ alkyl.

15. A composition according to claim 9, wherein in said copolymer, in at least a portion of the units having the formula (B), $R^3$ and $R^4$ are each H.

16. A composition according to claim 9, wherein in said copolymer, at least a portion of the dicarboxylic units (B) have the formula

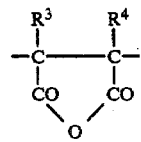

wherein $R^3$ and $R^4$ are each independently H or $CH_3$.

17. A composition according to claim 9, wherein in said copolymer, at least a portion of the dicarboxylic units (B) have the formula

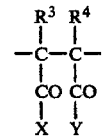

wherein $R^3$ and $R^4$ are each independently H or $CH_3$; and wherein at least one of X and Y is $OR^2$ or $OR^5$, $R^2$ being butyl or $C_{18}$ alkyl, and $R^5$ being the monovalent organic radical corresponding to the alcohol $R^5OH$, wherein $R^5OH$ is pentaerythritol, glycerol, trimethylolpropane, diethylethanolamine or diethanolamine.

18. A composition according to claim 9, wherein in said copolymer, at least a portion of the dicarboxylic units (B) have the formula

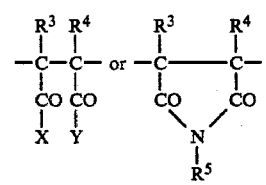

wherein $R^3$ and $R^4$ are each independently H or $CH_3$; and wherein at least one of X and Y is $NHR^5$, $R^5$ in all occurrences being the monovalent organic radical corresponding to the amine $R^5NH_2$, wherein $R^5NH_2$ is dimethylaminopropylamine, triethylenetetramine, tetraethylenepentamine, 2-aminopyridine or 1-cyanoguanidine.

19. A composition according to claim 8, wherein the hydrocarbon oil is diesel oil, domestic fuel oil, heavy fuel oil, fuel oil No. 2, residual fuel oil or crude petroleum, and wherein said copolymer has from 10 to 94% by mole of units having the formula (A), from 3 to 50% by mole of units having the formula (B) and from 3 to 40% by mole of units having the formula (C), and has a number average molecular weight of from 500 to 200,000.

20. A composition according to claim 19, wherein said terpolymer has from 40 to 80% by mole of units having the formula (A), from 10 to 35% by mole of units having the formula (B) and from 10 to 25% by mole of units having the formula (C).

21. A composition according to claim 19, wherein the number average molecular weight of said terpolymer is from about 1,000 to 70,000.

22. A composition according to claim 19, wherein the proportion of said copolymer is from 0.005 to 2% by weight.

23. A composition according to claim 22, wherein the proportion of said copolymer is from 0.01 to 0.5% by weight.

24. A composition according to claim 19, wherein in said copolymer, in at least a portion of the units having the formula (A), $R^1$ is H and $R^2$ is $C_{4-22}$ alkyl.

25. A composition according to claim 24, wherein $R_2$ is butyl, 2-ethylhexyl, lauryl, stearyl, eicosyl or docosyl.

26. A composition according to claim 19, wherein in said copolymer, in at least a portion of the units having the formula (B), $R^3$ and $R^4$ are each H.

27. A composition according to claim 19, wherein in said copolymer, at least a portion of the dicarboxylic units (B) have the formula

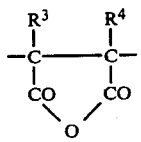

wherein $R^3$ and $R^4$ are each independently H or $CH_3$.

28. A composition according to claim 19, wherein in said copolymer, at least a portion of the dicarboxylic units (B) have the formula

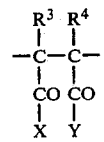

wherein $R^3$ and $R^4$ are each independently H or $CH_3$; and wherein at least one of X and Y is $OR^2$ or $OR^5$, $R^2$ being butyl or $C_{18}$ alkyl, and $R^5$ being the monovalent organic radical corresponding to the alcohol $R^5OH$, wherein $R^5OH$ is pentaerythritol, glycerol, trimethylolpropane, diethylethanolamine or diethanolamine.

29. A composition according to claim 19, wherein in said copolymer, at least a portion of the dicarboxylic units (B) have the formula

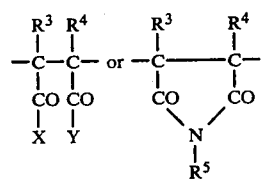

wherein $R^3$ and $R^4$ are each independently H or $CH_3$; and wherein at least one of X and Y is $NHR^5$, $R^5$ in all occurrences being the monovalent organic radical corresponding to the amine $R^5NH_2$, wherein $R^5NH_2$ is dimethylaminopropylamine, triethylenetetramine, tetraethylenepentamine, 2-aminopyridine or 1-cyanoguanidine.

30. A method of improving the cold-flow properties of a hydrocarbon oil, comprising adding to said oil an amount sufficient to improve its cold-flow properties of a copolymer according to claim 1.

* * * * *